(12) United States Patent
Wang et al.

(10) Patent No.: US 11,368,253 B2
(45) Date of Patent: Jun. 21, 2022

(54) SYSTEM TO IMPROVE THE PERFORMANCE AND STABILITY OF BONDING RADIOS

(71) Applicant: HEWLETT PACKARD ENTERPRISE DEVELOPMENT LP, Houston, TX (US)

(72) Inventors: Xuefu Wang, Beijing (CN); Jianpo Han, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 71 days.

(21) Appl. No.: 16/448,062

(22) Filed: Jun. 21, 2019

(65) Prior Publication Data

US 2020/0403732 A1 Dec. 24, 2020

(51) Int. Cl.
*H04L 1/18* (2006.01)
*H04L 1/16* (2006.01)
*H04W 84/18* (2009.01)

(52) U.S. Cl.
CPC .......... *H04L 1/1642* (2013.01); *H04L 1/1657* (2013.01); *H04L 1/1806* (2013.01); *H04W 84/18* (2013.01)

(58) Field of Classification Search
None
See application file for complete search history.

(56) References Cited

U.S. PATENT DOCUMENTS

| 6,956,855 | B1 | 10/2005 | Chang | |
| 7,543,079 | B1* | 6/2009 | Ho | H04L 1/0075 341/50 |
| 8,553,547 | B2 | 10/2013 | Ohana et al. | |
| 8,724,634 | B2 | 5/2014 | Marinier et al. | |
| 8,873,590 | B2 | 10/2014 | Kim et al. | |
| 9,455,750 | B2* | 9/2016 | Luby | H03M 13/3761 |
| 9,635,148 | B2 | 4/2017 | Tewari et al. | |
| 9,655,004 | B2 | 5/2017 | Yu et al. | |
| 2003/0226089 | A1* | 12/2003 | Rasmussen | H04N 21/64792 714/758 |
| 2005/0002357 | A1* | 1/2005 | Hu | H04W 52/34 370/332 |
| 2010/0223523 | A1* | 9/2010 | Dinan | H04L 1/0003 714/749 |
| 2010/0325301 | A1* | 12/2010 | Kwon | H04L 65/4069 709/231 |

(Continued)

OTHER PUBLICATIONS

Su, W. et al., The Jitter Time Stamp Approach for Clock Recovery of Real-time Variable Bit Rate Traffic, (Research Paper). Retrieved Jan. 11, 2019, 10 Pgs.

*Primary Examiner* — Mujtaba M Chaudry
(74) *Attorney, Agent, or Firm* — Nolte Lackenbach Siegel

(57) ABSTRACT

Systems and methods for improving the performance and stability of bonding radios are provided. One method includes receiving a packet from a client device. Next, the method includes determining whether the received packet is an expected next packet and transmitting the received packet to a next destination if the received packet is the expected next packet. In an event the received packet is not the expected next packet, transmitting the received packet to a queue, setting a timer to wait for the expected next packet, and transmitting a message to the sender of the received packet requesting that the expected next packet be sent.

8 Claims, 8 Drawing Sheets

(56) References Cited

U.S. PATENT DOCUMENTS

| | | | |
|---|---|---|---|
| 2011/0116443 A1* | 5/2011 | Yu | H04L 12/413 370/328 |
| 2014/0219284 A1* | 8/2014 | Chau | H04L 47/28 370/394 |
| 2015/0063211 A1* | 3/2015 | Kim | H04L 45/24 370/328 |
| 2016/0142343 A1 | 5/2016 | Tongle et al. | |
| 2019/0306038 A1* | 10/2019 | Hokanson | H04L 1/08 |

* cited by examiner

SYSTEM TO IMPROVE THE PERFORMANCE AND STABILITY OF BONDING RADIOS

BACKGROUND

In the context of a mesh network composed of nodes having multiple radios, each radio may be assigned to one of a plurality of channels, and the links between a pair of nodes may function as one logical link (e.g., bonded link). This logical grouping of wireless links is referred to as radio bonding. Advantageously, radio bonding can increase performance.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
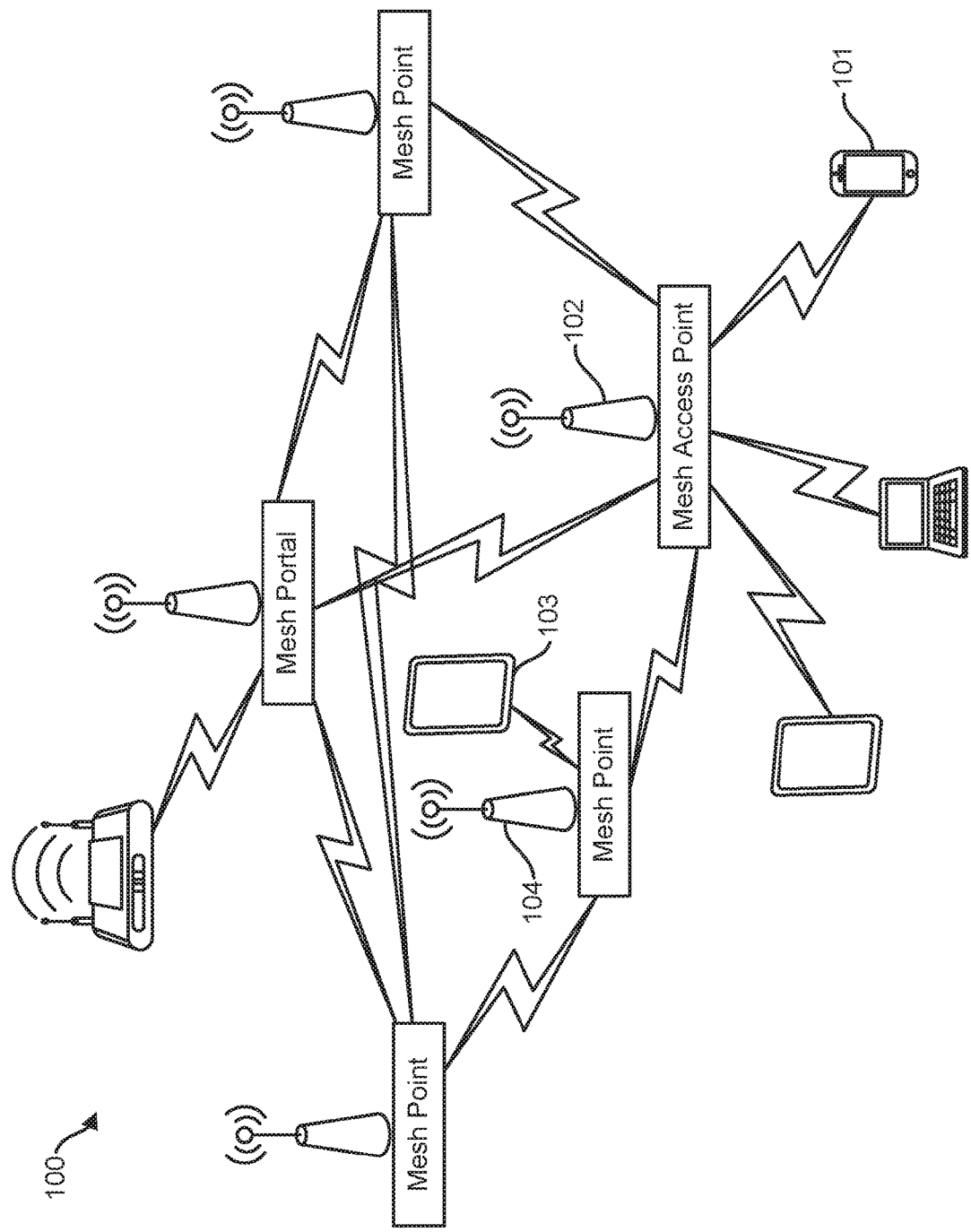
FIG. 1 is an illustration of a topology of a system which can be employed according to one or more implementations of the present disclosure.

Illustrative examples of the subject matter claimed below may now be disclosed. In the interest of clarity, not all features of an actual implementation are described in this specification. It may be appreciated that in the development of any such actual implementation, numerous implementation-specific decisions may be made to achieve the developers' specific goals, such as compliance with system-related and business-related constraints, which may vary from one implementation to another. Moreover, it may be appreciated that such a development effort, even if complex and time-consuming, would be a routine undertaking for those of ordinary skill in the art having the benefit of this disclosure.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

The present disclosure provides a fast packet re-transmission system for radio bonding systems that reduces the waiting time for lost packets thereby improving throughput. In addition, systems and methods of the present disclosure significantly reduce jitter attributed to video and voice transmissions. Furthermore, the present disclosure provides a new ethernet packet format and protocol. A packet may be defined herein as a chunk of data enclosed in one or more wrappers that help to identify the chunk of data and route it to the correct destination. The exact form of these wrappers or headers tends to be unique, not only among functions within a given protocol, but also across protocols.

Herein, the packets transmitted within a transmission link as discussed within the present disclosure may be voice packets. Alternatively, the packets transmitted within transmission links may be video packets. The plurality of packets includes link aggregation packets.

Ethernet is a local area network (LAN) set of protocols which serves the physical and data link layers. In some implementations, Ethernet utilizes a linear bus or star topology. It should be understood by those having ordinary skill in the art that Ethernet served as the basis for the IEEE 802.3 standard. Generally, Ethernet deals with the low level physical and data link layers. The transmission speed of Ethernet is measured in millions of bits per second, or Mbps. Ethernet typically comes in three different speed versions: 10 Mbps, known as Standard Ethernet; 100 Mbps, known as Fast Ethernet; and 1,000 Mbps, known as Gigabit Ethernet. Network transmission speed refers to the maximum speed that can be achieved over the network under ideal conditions.

Previous methods which have attempted to improve the performance of bonding radios include creating Layer 3 tunnel link aggregation between an access point (AP) and a controller. However, this method typically involves a Generic Routing Encapsulation tunnel and an ethernet port. Alternatively, the present disclosure is implemented on a radio by creating a Layer 2 link aggregation which can work for various forwarding modes and in other methods such as, but not limited to, Long-Term Evolution (LTE). Advantageously, the systems and methods disclosed herein are adaptive to asymmetric physical layer (PHY), in some implementations.

Turning now to the drawings, FIG. 1 is an illustration of a topology 100 of a system which can be employed according to one or more implementations of the present disclosure. In a mesh network, an AP may use its own radio to provide a wireless backhaul to other APs on the network, eventually reaching an AP with a wired Ethernet connection to the wired backhaul infrastructure and the network. In this sense, a mesh network is a network of repeaters, though a mesh may be designed to operate automatically and more intelligently on a large scale. A mesh network can create a set of "dynamic WDS Bridge" links using routing algorithms to automatically calculate the most optimal wireless path through the network back to a wired root node. This makes mesh networks relatively robust to the failure of an individual AP; in a process referred to as "self-healing", the routing algorithms may automatically calculate the "next best" path through the network if an AP in the path goes offline. Since the routing functions are done automatically within the mesh software, mesh networks are actually fairly straightforward to set up and are thus scalable to cover large geographic areas. All wired Layer 2 information (i.e., client MAC addresses, VLANs, etc.) are preserved across the mesh link. The mesh network control architecture can either be centralized or distributed. With a centralized control architecture, an AP controller is employed to calculate and coordinate mesh parameters for each AP.

Topology 100 may represent a wireless mesh which includes a first client device 101, a first AP 102, a second client device 103, and a second AP 104. As shown, the first client device 101 is communicatively coupled (e.g., directly) to the first AP 102 and the second client device 103 is communicatively coupled (e.g., directly) to the second AP 104.

Notably, the first AP 102 includes a transmitter (not shown) and the second AP 104 includes a receiver (not shown). The first AP 102 can transmit packets (e.g., video packets) to the second AP 104. The first AP 102 may be IEEE 802.11ac compliant whereas the second AP 104 may be IEEE 802.11ad compliant. Packets may be first sent by the first client device 101 and received by the first AP 102. In one implementation, packets are transmitted via a IEEE 802.11ac or 802.11ad protocol according to a load balance algorithm to balance the load on both the first AP 102 and the second AP 104. In some implementations, load balancing is employed by a load-balancing server.

Figure 2:
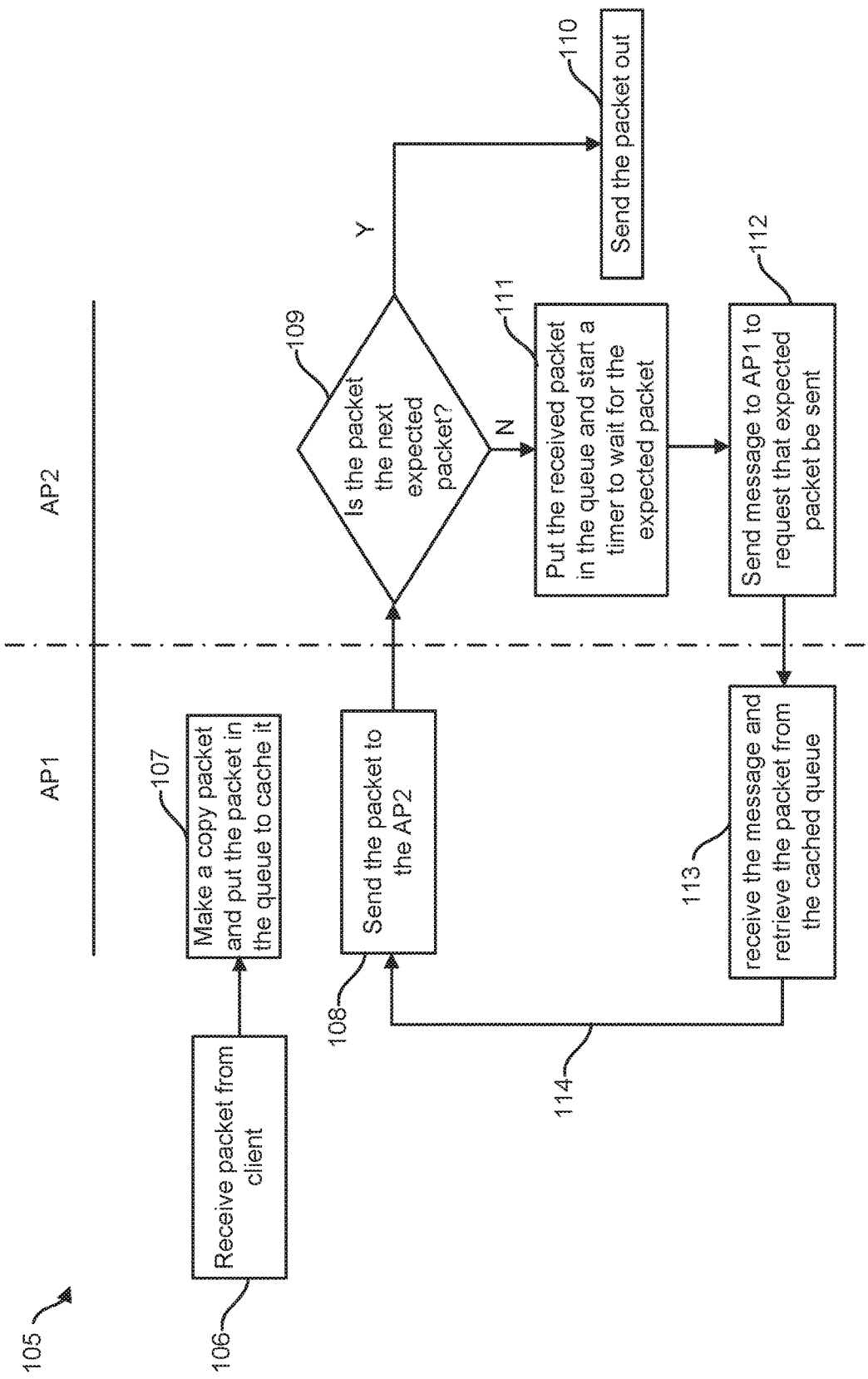
FIG. 2 is an illustration of one manner of implementing fast re-transmission of a lost packet, according to one or more examples of the present disclosure.

FIG. 2 is an illustration of one manner of implementing fast re-transmission of a lost packet in a transmission link, according to one or more examples of the present disclosure. In one or more implementations, one pair of bonding radios are on different ends of a transmission link. Notably, the present disclosure may be employed to improve the performance, reliability, and stability on the backhaul of bonding radios.

Herein, backhaul may be defined as transporting traffic between distributed sites (e.g., APs) and more centralized points of presence. In a hierarchical telecommunications network, for example, the backhaul portion of a network comprises the intermediate links between the core network, or backbone network, and the small subnetworks at the edge of the network. In another implementation, cell phones communicating with a single cell tower constitute a local subnetwork; the connection between the cell tower and the rest of the world begins with a backhaul link to the core of the Internet service provider's network (via a point of presence). As such, the term backhaul may be used to describe the entire wired part of a network, although some networks have wireless instead of wired backhaul, in whole or in part, for example using microwave bands and mesh network and edge network topologies that may employ a high-capacity wireless channel to get packets to the microwave or fiber links.

In a wireless mesh LAN, information can be returned to a wired AP to reach the wider Internet. Small wireless mesh networks handle backhaul without special configurations. In larger mesh networks, nodes can be dedicated as backhaul nodes. The other nodes send all outgoing information directly to one of the backhaul nodes, which will send it to the wired AP without unnecessary hops.

In a wireless network, each AP requires a wired Ethernet connection to provide backhaul to the wired network infrastructure and ultimately the Internet. In some environments, however, it is difficult or prohibitively expensive to run an Ethernet cable to each AP. In such cases, Wi-Fi itself can be used to provide wireless backhaul from the AP (or other network appliance, such as a remote IP camera) to the wired network. Each Wi-Fi backhaul link is referred to as a hop, and it is possible to have a chain of multiple hops between the remote wireless AP to the root wireless AP that has a wired connection to the network.

For each pair of bonded radios, one of the radios may be IEEE 802.11ac compliant whereas the other bonded radio may be IEEE 802.11ad compliant. As will be appreciated by those having ordinary skill in the art, IEEE 802.11 is a set of media access control (MAC) and physical layer (PHY) specifications for implementing wireless local area network (WLAN) computer communication in the 2.4, 3.6, 5, and 60 GHz frequency bands.

Notably, the WiFi standard is 802.11 ac has over 1 Gb/s transfer speeds and can be operated in 5 GHz frequency band only and may have a range of approximately 35 m (115 ft). However, it is common to find dual-band 802.11 ac routers which operate in the 2.4 and 5 GHz frequency ranges. The IEEE 802.11 ac specification is divided into two certification phases; Wave 1 and Wave 2. WiFi 802.11 ac Wave 2 which was published by the WiFi alliance in 2015 supports an optional 160 MHz channel and MU-MIMO antenna formation which causes a speed boost of 2.34 Gbps (up from 1.3 Gbps) in the 5 GHz band may be achieved. WiFi standard 802.11 ac may be referred to herein as Gigabit WiFi.

WiFi 802.11 ad which may also be referred to herein as WiGig was developed by the Wireless Gigabit Alliance provides multi-gigabit per second speeds over unlicensed 60 GHz frequency band unlike 802.11 ac which works on 5 Ghz band. WiGig may operate in a range of approximately 3.3 m (11 ft).

Accordingly, IEEE 802.11ac and IEEE 802.11ad improve upon the wireless capabilities introduced in IEEE 802.11n. IEEE 802.11ad using spectrum in the unlicensed 60 GHz band, where far more overall bandwidth is available than either the 2.4 or 5 GHz bands currently utilized in IEEE 802.11. The Wireless Gigabit Alliance (WiGig) initiated the specification development to take advantage of this spectrum, but their work has been rolled into the IEEE 802.11ad draft specification.

In some implementations of the present disclosure, IEEE 802.11ad is used for in-room wireless connections whereas IEEE 802.11ac follows the evolution of 802.11b to 802.11g to 802.11n. Furthermore, IEEE 802.11ad stands alone as a potential HDMI cable replacement or for other short-range, low-user density applications. Advantageously, IEEE 802.11ac is effectively "faster WiFi", whereas IEEE 802.11ad is effectively "wireless HDMI". Notably, IEEE 802.11ac can deliver greater capacity to a large coverage cell while 802.11ad will provide dramatic throughput to a few users in a small area. IEEE 802.11ac is a wireless LAN while IEEE 802.11ad is a wireless personal area network. The present disclosure is not limited to employing pairs of IEEE 802.11ac and IEEE 802.11ad radios. In some implementations, the pair of client devices includes two IEEE 802.11ac radios.

In particular, FIG. 2 provides a flowchart 105 for implementing fast re-transmission of a lost packet. Flowchart 105 begins with block 106—receive a packet from a client. Once the packet is received, a copy of the packet is cached (block 107). The flowchart 105 proceeds with sending the packet from a first AP to a second AP (block 108).

Once the packet is received at the second AP, the packet is inspected to determine whether the packet is a next expected packet (block 109). If the packet received is the next expected packet, the packet is sent out (block 110). Alternatively, if the packet received is not the next expected packet, the received packet may be placed in a queue and a timer is started for a pre-determined time (e.g., <1 s) to wait for the expected packet (block 111).

A timer herein may be defined as a specialized type of clock used for measuring specific time intervals. Timers can be categorized into two main types. A timer which counts upwards from zero for measuring elapsed time is often referred to as a stopwatch, while a device which counts down from a specified time interval is more usually called a timer. In one implementation, a decrementing timer is employed such that the received packet(s) may be queued for a pre-determined time frame.

In some implementations, a message is sent (according to path 114) to the first AP to request that the expected packet be sent to the second AP (block 108). The message may be received and the packet may be retrieved from the cached queue (block 113).

Figure 3A:
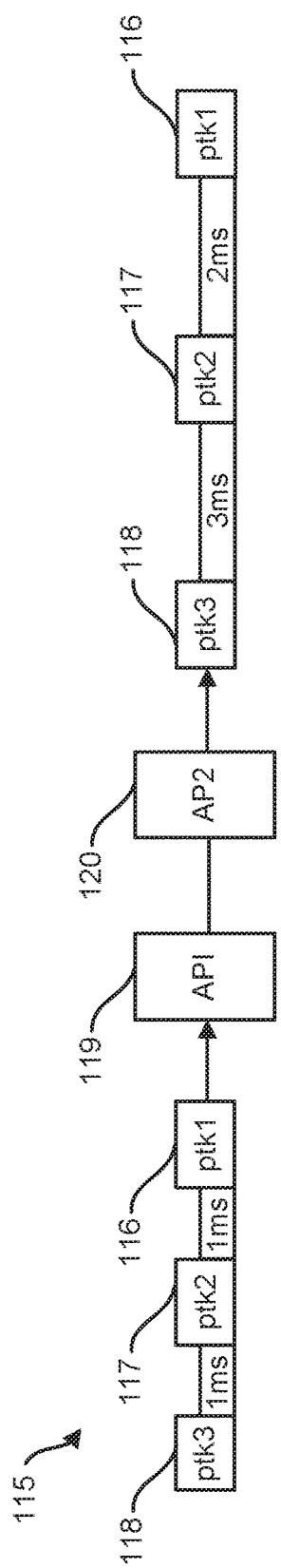
FIG. 3A is an illustration of jitter within a transmission link, according to one or more examples of the present disclosure.

FIG. 3A is an illustration of jitter within a transmission link, according to one or more examples of the present disclosure. As shown, FIG. 3A illustrates a transmission link 115 for packets being transmitted to and from a first and second AP 119, 120. As shown, a series of packets 116-118 may be sent to a first AP 119 at a same time interval (e.g., 1 ms). However, due to jitter or other deleterious effects, the packets 116-118 may not be received or sent from the second AP 120 at the same time interval but at different time intervals (e.g., 2 ms and 3 ms), Jitter and other deleterious effects may create bottlenecks and performance constraints. It should be understood that the time intervals used herein are examples and the time intervals may be greater than or less than a few milliseconds.

Figure 3B:
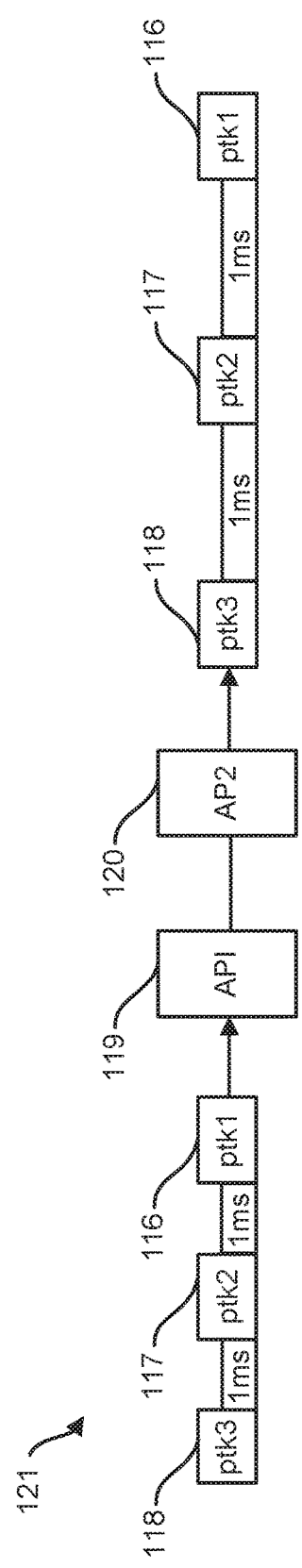
FIG. 3B is an illustration of one manner of decreasing jitter within a transmission link, according to one or more examples of the present disclosure.

FIG. 3B is an illustration of one manner of decreasing jitter within a transmission link, according to one or more examples of the present disclosure. In particular, FIG. 3B illustrates a transmission link 121. Notably, the packets 116-118 are transmitted to and from a first AP 119 at a same time interval (e.g., 1 ms) and may be sent from the second AP 120 at another time interval (e.g., 2 ms). In one implementation, the packets 116-118 are cached and then transmitted once they are received at a same time interval to avoid jitter.

Figure 4:
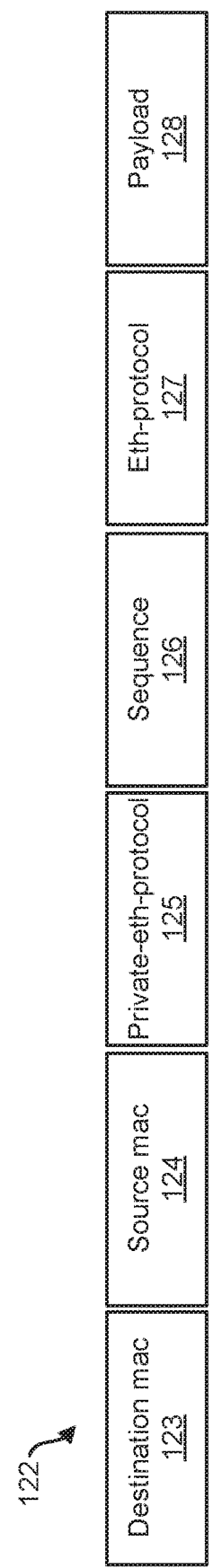
FIG. 4 is a packet protocol format, according to one or more examples of the present disclosure.

FIG. 4 is a packet protocol format 122, according to one or more examples of the present disclosure. Packet protocol format 122 includes a destination media access control address (MAC) 123, source media access control address (MAC) 124, private ethernet protocol 125, a sequence number 126, an ethernet protocol 127, and a payload 128. A client device (e.g., AP) may receive a packet and reconfigure the packet according to the packet protocol format 122 shown in FIG. 4. In one implementation, the client device reconfigures the packet by adding a private ethernet protocol 125 and sequence number 126. In some implementations, a receiver of the reconfigured packet may reconfigure the received packet by removing the private ethernet protocol 125 and sequence number 126. In a preferred implementation embodying the present disclosure that will be discussed in detail, both the host and target computer systems communicate messages using an Ethernet network connection and a private Ethernet protocol.

Figure 5:
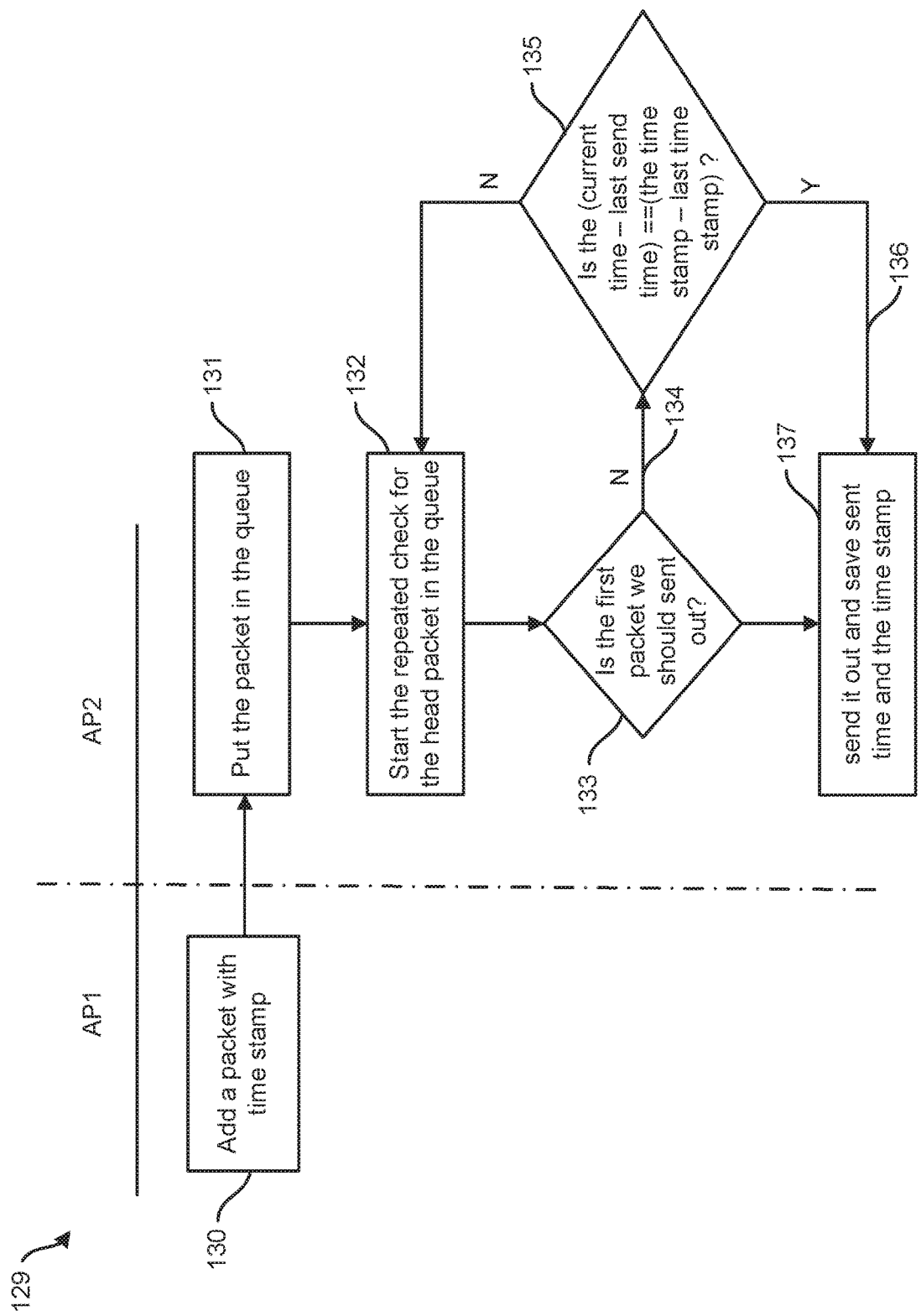
FIG. 5 is a method for timestamping packets within a transmission link, according to one or more implementations of the present disclosure.

FIG. 5 is a method for timestamping packets within a transmission link, according to one or more implementations of the present disclosure. In particular, the method is implemented in flowchart 129. Flowchart 129 begins with adding a timestamp to a packet (block 130).

Herein, a timestamp is defined as a sequence of characters or encoded information identifying when a certain event occurred, usually giving date and time of day, sometimes accurate to a small fraction of a second. A timestamp may be used as a mechanism for a wide variety of synchronization purposes, such as assigning a sequence order for a multi-event transaction so that if a failure occurs the transaction can be voided.

The flowchart 129 includes putting the packet which the timestamp was added to into a queue (block 131). Next, the flowchart 129 also includes starting a repeated check for the head packet in the queue (block 132). The flowchart 129 further includes determining whether the first packet should be sent out (block 133). If not (branch 134), the flowchart 129 includes determining whether the current time less than the last send time is equal to the timestamp less the last timestamp (block 135). If block 135 is true, the flowchart 129 includes sending out the packet and saving the sent time and the timestamp (block 137) via path 136. Alternatively, if according to block 133, the first packet is to be sent out, the flowchart 129 includes sending the packet out and saving the send time and the timestamp (block 137).

Figure 6:
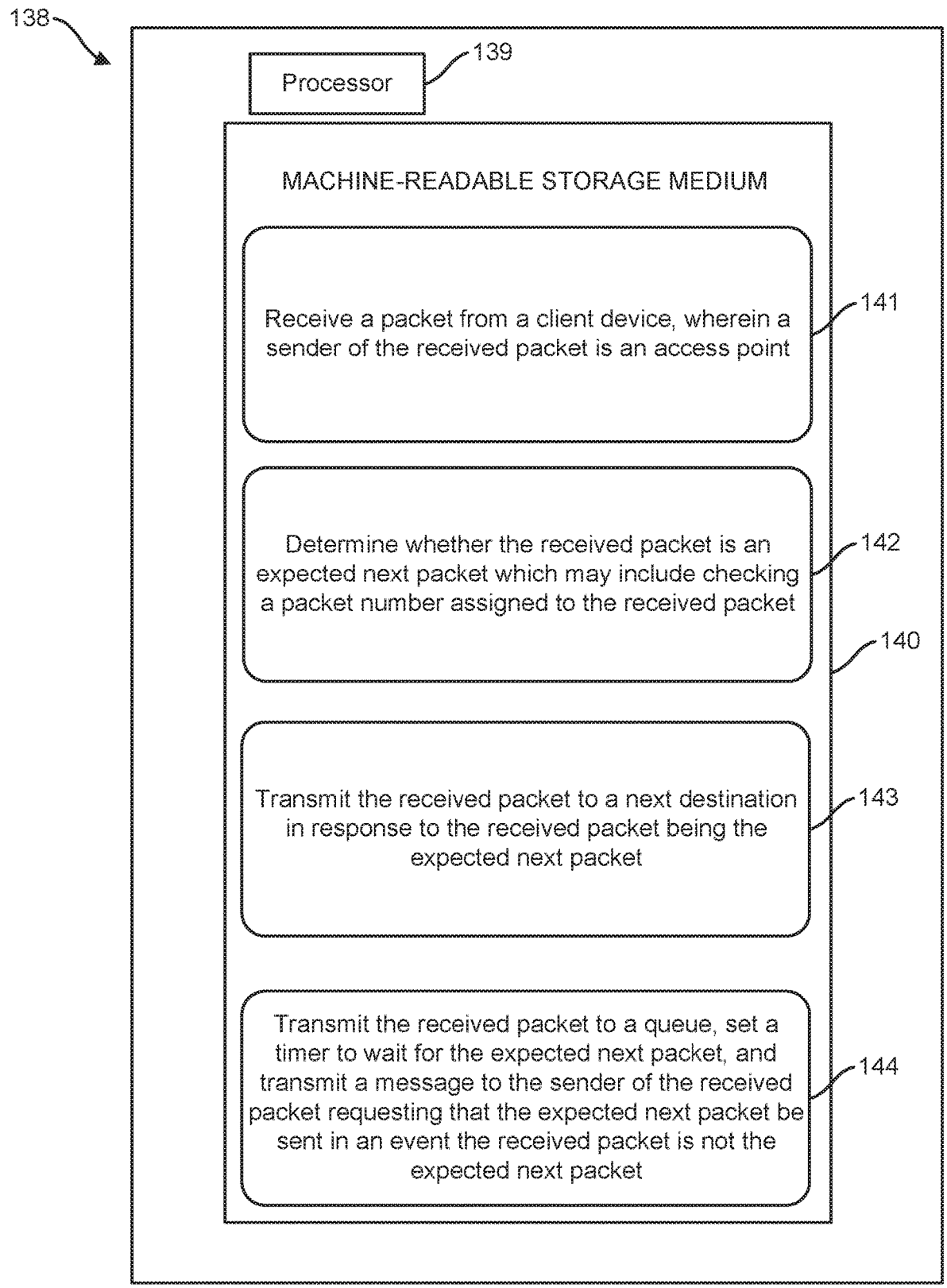
FIG. 6 is an illustration of a computing system, according to one or more examples of the present disclosure.

FIG. 6 is an illustration of a computing system 138, according to one or more examples of the present disclosure. The computing system 138 may include a non-transitory computer readable medium 140 that includes computer executable instructions 141-144 stored thereon that, when executed by one or more processing units 139 (one processor shown), causes the one or more processing units 139 to effect fast re-transmission of packets along a transmission link between bonded radios.

Computer executable instructions 141 include receiving a packet from a client device (e.g., bonded radio). Computer executable instructions 142 include determining whether the received packet is an expected next packet. In addition, computer executable instructions 143 include transmitting the received packet to a next destination (e.g., bonded radio) if the received packet is the expected next packet. Further, if the received packet is not the expected next packet, transmitting the received packet to a queue, starting a timer to wait for the expected next packet, and transmitting a message to the sender of the received packet requesting that the expected next packet to be sent according to the computer executable instructions 144.

Figure 7:
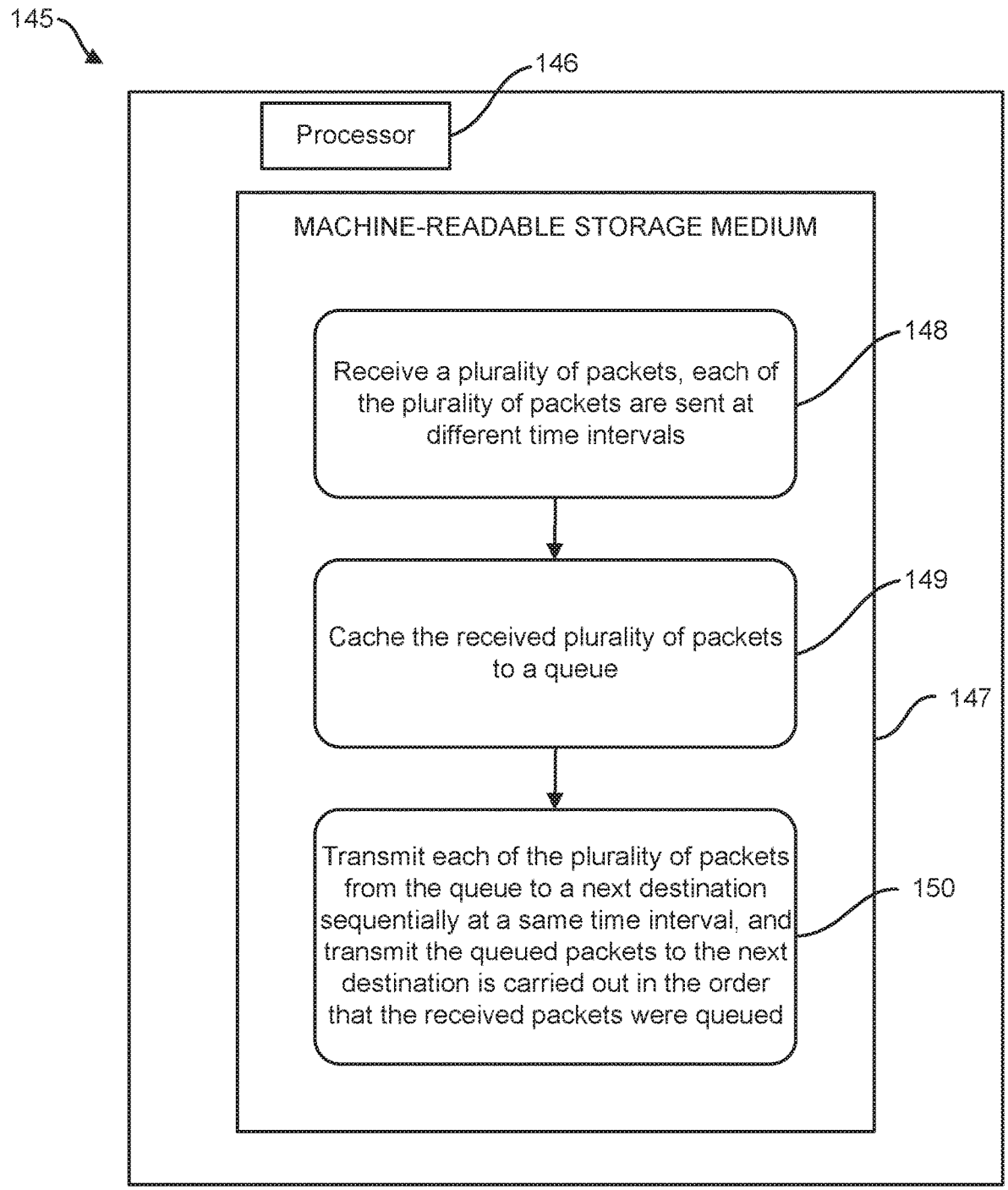
FIG. 7 is an illustration of yet another computing system, according to one or more examples of the present disclosure.

FIG. 7 is an illustration of yet another computing system 145, according to one or more examples of the present disclosure. The computing system 145 may include a non-transitory computer readable medium 147 that includes computer executable instructions 148-150 stored thereon that, when executed by one or more processing units 146 (one shown), causes the one or more processing units 146 to effect fast re-transmission of packets along a transmission link between bonded radios.

Computer executable instructions 148 include receiving a plurality of packets, each of the plurality of packets are sent at different time intervals. Next, the computing system 145 includes computer executable instructions 149 that include caching the received plurality of packets to a queue. Further, the computing system 145 includes computer executable instructions 150 include transmitting each of the plurality of packets from the queue to a next destination sequentially at a same time interval. The queued packets were transmitted to the next destination in the order that the received packets were queued.

Figure 8:
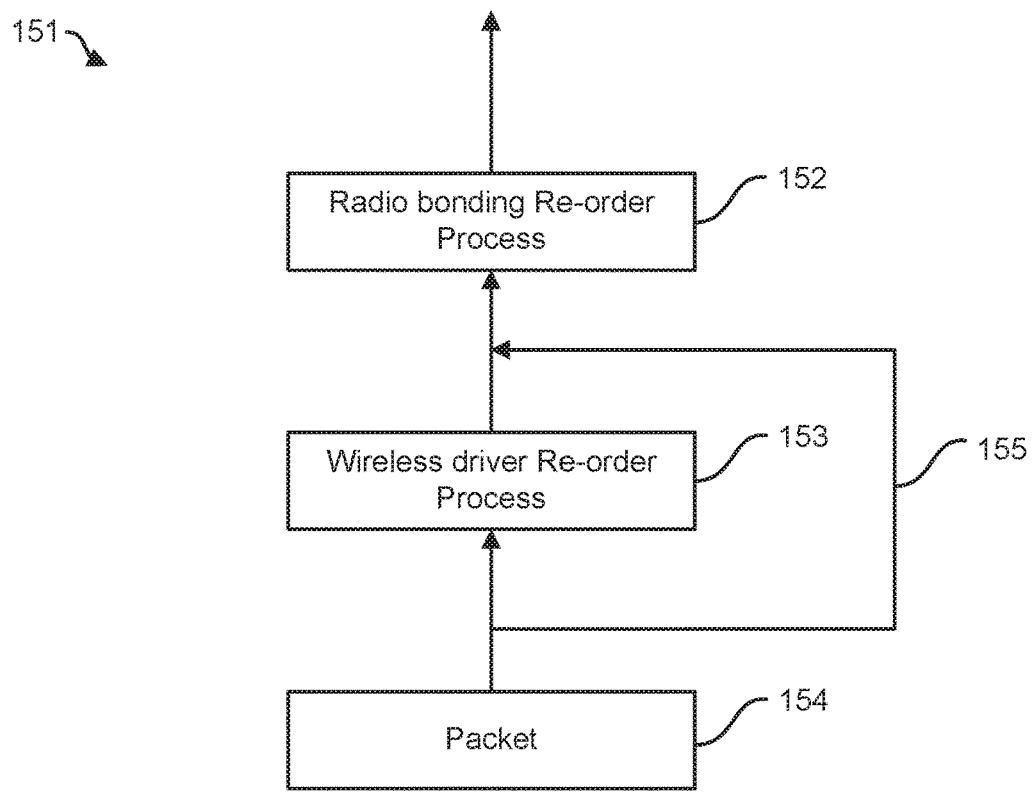
FIG. 8 is a flowchart for implementing a bypass re-order sequence according to one or more examples of the present disclosure.

FIG. 8 is a flowchart 151 for implementing a bypass re-order sequence according to one or more examples of the present disclosure. As described herein, a radio bonding process consistent with the present disclosure provides a re-order sequence of received packets as the packets are transmitted through a wireless link. In one implementation, the radio bonding process includes a re-order sequence, and thus, a network device (e.g., an access point) which seeks to institute a re-order sequence may be omitted (e.g., skipped) to prevent the execution of consecutive re-order sequencing.

In the example shown, packet 154 may reach a network device (e.g., access point), which is not shown, where a re-order sequence is to be implemented. In the example, the network device may be configured to institute a wireless driver re-order sequence 153. In the embodiment shown, the wireless driver re-order sequence 153 may be skipped (e.g., via path 155) and then a radio-bonding re-order sequence 152 may be instituted. Accordingly, the process illustrated in FIG. 8 promotes the efficient transmission of packets along a wireless link.

Figure 9:
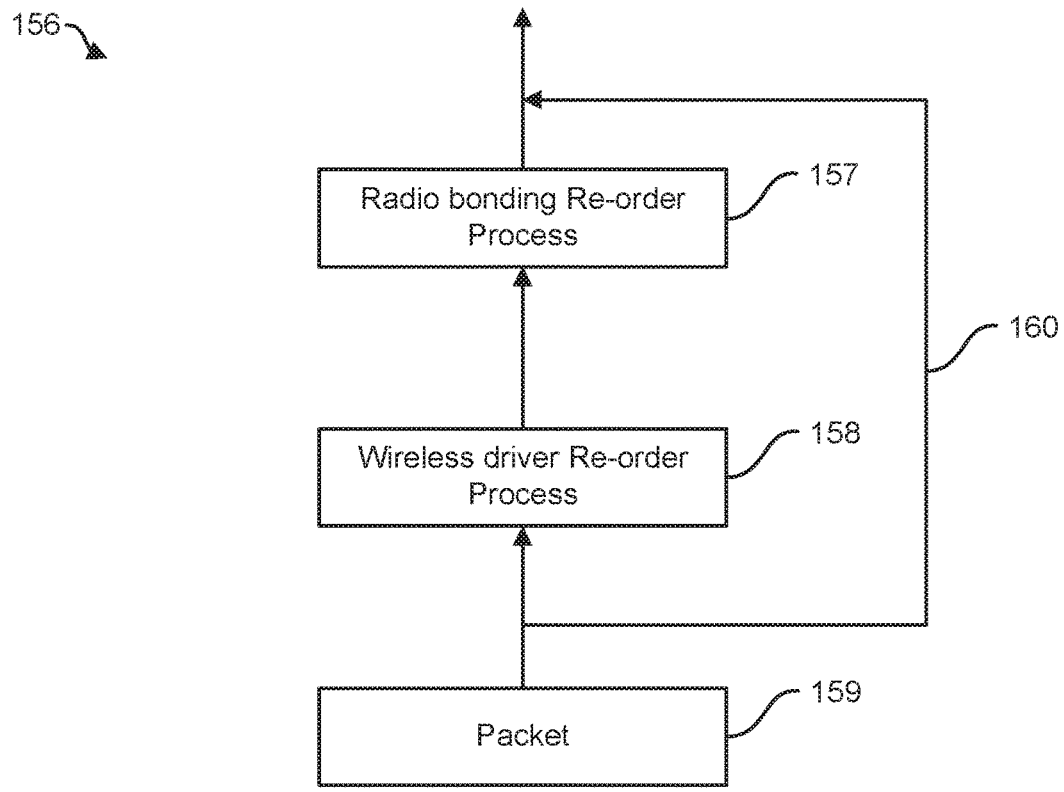
FIG. 9 is a flowchart for implementing yet another bypass re-order sequence according to one or more examples of the present disclosure.

FIG. 9 is a flowchart 156 for implementing yet another bypass re-order sequence according to one or more examples of the present disclosure. It should be understood by those having ordinary skill in the art that not every packet transmitted within a wireless link needs to be received (e.g., at a receiver device) in the order of transmission. For example, an ACK packet (e.g., TCP ACK), which communicates the acknowledgement of received packets may not need to be received in any particular order. Accordingly, for some packets, there is no need for a re-order and therefore each re-order sequence can be skipped.

As shown, the example packet 159 skips the wireless driver re-order sequence 158 and the radio bonding re-order sequence 157 as shown by path 160.

Figure 10:
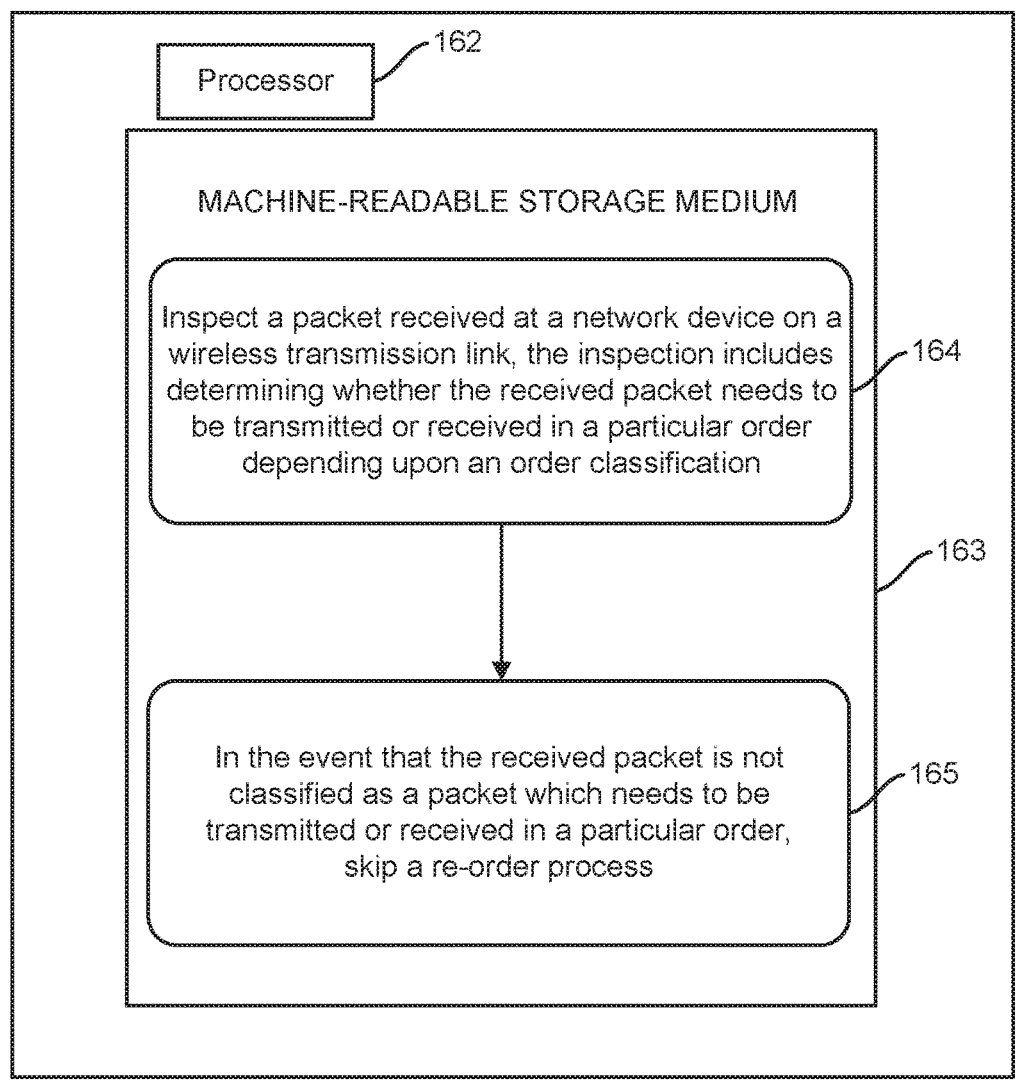
FIG. 10 is an illustration of a computing system, according to one or more examples of the present disclosure.

FIG. 10 is an illustration of a computing system, according to one or more examples of the present disclosure. The computing system 161 may include a non-transitory computer readable medium 163 that includes computer executable instructions 164-165 stored thereon that, when executed by one or more processing units (one processor 162 shown), causes the one or more processing units to effect a fast transmission of packets by omitting one or more re-order sequences.

Computer executable instructions 164 include inspecting a packet received at a network device on a wireless transmission link. In one implementation, the inspection includes determining whether the received packet needs to be transmitted or received in a particular order depending upon an order classification. In addition, the computing system 161 includes computer executable instructions 165 which include that in the event that the received packet is not classified as a packet which needs to be received or transmitted in a particular order, skipping a re-order sequence.

One having ordinary skill in the art may appreciate that a re-order sequence may be instituted by a network device (e.g., access point). For example, an access point which receives a packet may seek to institute a wireless driver re-order sequence. In addition, a re-order sequence may be instituted by a fast packet re-transmission system for radio bonding systems that reduces the waiting time for lost packets thereby improving throughput.

The foregoing description, for purposes of explanation, used specific nomenclature to provide a thorough understanding of the disclosure. However, it may be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method, comprising:
receiving, at a second access point (AP) from a first AP channel bonded with the second AP, a packet from a client device;
determining, at the second AP, whether the received packet is an expected next packet;
in response to the received packet being the expected next packet, transmitting, by the second AP, the received packet to a next destination; and
in an event the received packet is not the expected next packet:
  placing, by the second AP, the received packet in a queue,
  setting, by the second AP, a timer to wait for the expected next packet, and
  transmitting, by the second AP, a message to the first AP requesting that the expected next packet be sent.

2. The method of claim 1, further comprising adding a timestamp on each received packet.

3. The method of claim 1, wherein the client device is a third access point (AP).

4. The method of claim 1, wherein upon an expiration of the timer, the received packet is transmitted to the next destination.

5. The method of claim 4, wherein the timer is a decrementing timer such that, after expiration of a predetermined time frame, the received packet is sent to the next destination.

6. The method of claim 1, wherein determining whether the received packet is the expected next packet includes checking a packet number assigned to the received packet.

7. The method of claim 1, wherein the client device that sends the packet is a IEEE 802.11ac compliant device and the next destination is an IEEE 802.11ad compliant device.

8. The method of claim 1, wherein the first AP retrieves the packet from the queue responsive to receiving the message from the second AP.

* * * * *